Aug. 2, 1927.

L. W. BUGBEE, JR 1,637,408

CURVATURE MEASURING DEVICE

Filed Dec. 8, 1925

INVENTOR.
LUCIAN W. BUGBEE, JR.
BY
ATTORNEYS.

Patented Aug. 2, 1927.

1,637,408

UNITED STATES PATENT OFFICE.

LUCIAN W. BUGBEE, JR., OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

CURVATURE-MEASURING DEVICE.

Application filed December 8, 1925. Serial No. 74,207.

This invention was conceived and made primarily for the purpose of measuring and indicating the curvature of ophthalmic lenses, and particularly the dioptrics thereof, but its use is not limited to lenses, as it will measure and indicate the curvature of any other article.

In prior curvature measuring devices a central plunger or pin has been employed, located between two fixed pins, the three pins being in substantial alignment with each other and when applied to a curved surface, the central pin or plunger is moved out or in, dependent upon the curvature, and the motion of such central pin or plunger is transmitted to a dial or other measuring and indicating means by complicated, delicate and therefore easily derangeable system of levers and gears. This results in error and uncertainty and is often not wholly satisfactory, especially where accurate curvature measurement is required.

The object of this invention is to overcome the difficulties with said former measuring devices and consists, broadly speaking, in the combination with the pin or plunger of a micrometer, having micrometer screw, of two fixed pins, one on each side of said movable pin or plunger, so that the micrometer can be applied to the curved surface and will measure and indicate the movement of the central pin or plunger and thereby the curvature of the surface.

Another feature of this invention consists in providing such combined micrometer curvature measuring device with a diopter scale and pointer, so that it will immediately indicate the diopter of the curvature without the calculations required when the device is provided with scales of the usual micrometer.

Figure 1:
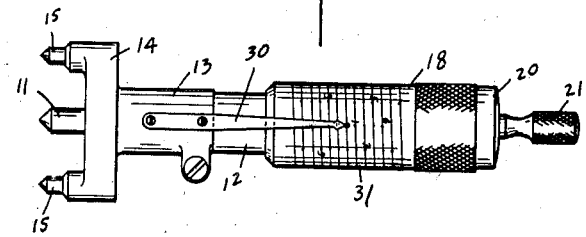
Figure 2:
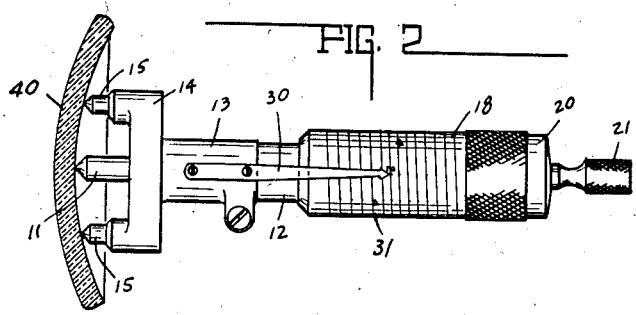
Figure 3:
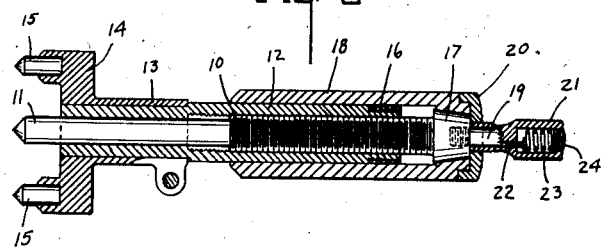
Figure 4:
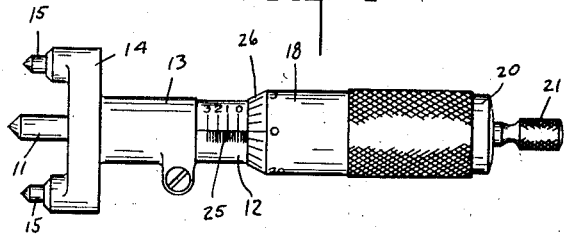

The full nature of this invention will be understood from the accompanying drawings and the following description of the claims:

In the drawings, Figure 1 is a plan view of the device adapted to indicate diopters, the device as shown in this figure being at 0. Fig. 2 is a plan view of such device with the cross section of an ophthalmic lense or like curved article, the scale indicating the diopter of the curvature. Fig. 3 is a central vertical section of the device as shown in Fig. 1. Fig. 4 is a plan view of the device without the means for indicating diopters.

There is shown herein a micrometer screw 10 with an extended pin 11, tapering to a point at its end. Said screw is mounted in a tube 12, threaded internally to receive the threaded portion of the screw and with a non-threaded end portion through which the smooth portion of the pin 11 extends. The latter end of the tube is turned down somewhat, as shown in Fig. 3. There is clamped about the turned down portion of the tube a sleeve 13 carrying a plate 14 at a right angle therewith, and said plate carries two fixed pins 15 on diametrically opposite sides of the movable and central pin 11.

The remainder of the device, so far as its mechanical construction is concerned, is substantially the same as the ordinary screw micrometer or caliper. There is a lock nut 16 on the screw 10, at the outer end of the tube 12, and there is a tapering head 17 on the outer end of the screw, on which a thimble 18 is secured fixedly so the thimble and screw will turn together. There is secured to the head 17 of the screw a tubular stem 19, that projects through the cap 20 and its outer end is notched annularly. A finger piece 21 has a stem on its inner end extending in and rotatable in the stem 19 and the finger piece is locked with the stem 19 and screw by a plunger pin 22 that engages the teeth on the stem 19, but is yieldingly held in place by spring 23, the tension of which is adjustable by the nut 24. This enables one to turn the screw by means of the finger piece 21, but such turning movement will automatically cease or stop when the pin on the screw contacts with the surface being measured and thus prevent the pin from injuring the surface of the lens or the like.

The surface of the sleeve 12 at the inner end of the thimble 18, in the form shown in Fig. 4, has a longitudinal series of graduations 25, which are numbered; and the inner end of the thimble 18 is beveled and provided with a series of graduations 26 annularly disposed and numbered. The graduations shown in Fig. 4 are the same as provided in the usual screw micrometer or micrometer caliper. The pitch of the screw threads on the concealed portion of the screw may be one-fortieth of an inch as usual. Hence, each revolution of the screw causes a lengthwise movement of one-fortieth of an inch or twenty-five thousandths. The scale 25 has a series of transverse lines, each indicating a distance of one-fortieth of an inch and each numbered line indicates a distance of four times one-fortieth of an inch, or one-tenth of an inch.

In using the simpler device shown in Fig. 4, it is applied to a lens 40 or curved surface, as shown in Fig. 2, and the micrometer screw operated until it barely touches the surface and the depth of the curvature is calculated in the manner above explained; then a further calculation is required to determine the diopter of the curvature of the lens.

The form shown in Figs. 1, 2 and 3 indicates at once and without calculations of any kind the dioptral value of the curved surface. To that end, it is provided with a pointer 30 secured to the sleeve 13 and extending outwardly and longitudinally with an arrow head on its outer end over a portion of the thimble 18, which is provided with a diopter scale 31, extending spirally around the thimble. This scale has numerals at suitable places thereon to indicate the dioptral value of the curved surface to which the instrument is applied. Thus, in Fig. 2, the lens 40 shown has a curvature of two diopters, as the pointer 30 points to the numeral 2 on the spiral scale. In changing from a two diopter curvature to a four diopter curvature there would be required more than one turn of the screw. It is provided with a zero point, as shown in Fig. 1, indicating that the surface to which the instrument is applied is flat. As the pin 11 is screwed upward to accommodate a convex surface, the numerals below the zero point would indicate plus curvatures and when the pin 11 is screwed down for convex surfaces, as shown in Fig. 2, the numerals above the zero point will indicate the curvatures. This makes a spiral calibrated scale on the micrometer thimble, which is divided into the familiar diopter graduations used by opticians to express curvature, although it might also be calibrated to indicate directly the millimeter radii or curvature.

When the measuring device shown in Fig. 2, therefore, is applied to the flat surface, the pointer at 30 will point to the intersection of lines 32 and 33, showing zero. But when it is applied to a curved surface, such as the concave side of the lens shown in Fig. 2, and the central movable pin screwed down until it touches the lens, it will point to the numeral 2 in the inner series of graduations 31, which shows a minus 2 diopter. If the measuring device were applied to the convex side of lens shown in Fig. 3, the pointer would point to the numeral 2 in the outer series of graduations 31, which would indicate a plus 2 diopter curvature.

Therefore, as is apparent from the foregoing description, the screw micrometer is herein adapted for the measurement of the curvature of lenses and other curved surfaces. The simpler form shown in Fig. 4 indicates the depth of the curved surface and the diopter is determined by calculations therefrom, which are familiar to optician. On the other hand, if the form in device shown in Fig. 2 be employed, it will indicate at once the diopter of the curvature and whether it is positive or negative, and no calculations will be required.

The invention claimed is:

1. A curvature measuring device including a micrometer screw having a pin at one end, a threaded tube in which said screw is threaded and longitudinally movable, a thimble secured to the other end of the screw and surrounding said tube, said thimble and tube being provided with means for determining the relative movements of said parts, a plate secured to and extending laterally of the tube, and fixed pins in said plate on diametrically opposite sides of said first mentioned pin, whereby the curvature of a curved surface may be determined.

2. A curvature measuring device, substantially as set forth in claim 1, in which said means for determining the relative movements of said parts includes a diopter scale on said thimble for determining the dioptral value of a lens or other curved surface.

3. A curvature measuring device including the combination with a micrometer having a tube, and a pin longitudinally movable in the tube, of means in fixed connection with said tube and means in fixed connection with said pin cooperating to determine the extent of relative movements of the tube and pin, a plate secured to the tube having fixed pins of equal length on opposite sides of said movable pin and parallel therewith and of such length that the device will indicate zero when applied to a plane surface, whereby the curvature of a curved surface may be accurately determined.

4. A curvature measuring device as set forth in claim 3, said curvature determining means including a diopter scale for measuring and indicating the dioptral value of a lens having a curved surface.

5. A curvature measuring device including a micrometer screw with a pin at one end, a tube which is internally threaded for receiving said screw and causing the longitudinal movement of said pin when the screw is rotated, a thimble secured to the other end of the screw and surrounding said tube so that it will travel longitudinally of the tube as the screw is rotated, a plate on the tube extending laterally thereof, fixed pins on said plate on diametrically opposite sides of the pin on the screw and parallel therewith, and a pointer mounted in fixed relation to said tube and extending partly over said thimble, said thimble being provided with a diopter scale around the same with which the pointer registers, whereby the degree of curvature of a curved surface will be indicated.

6. A surface measuring device as set forth in claim 5, said diopter graduations consisting of two series, one for plus diopters and the other for minus diopters.

7. A curvature measuring device as set forth in claim 5, with a yieldingly mounted finger piece on said micrometer screw adapted to stop the movement of the screw as soon as the screw pin contacts with the surface being measured, whereby the finishing surface of the lens will not be injured by the use of the measuring device.

In witness whereof, I have hereunto affixed my signature.

LUCIAN W. BUGBEE, Jr.